US011905730B2

(12) United States Patent
Meyer et al.

(10) Patent No.: US 11,905,730 B2
(45) Date of Patent: Feb. 20, 2024

(54) SECURITY APPARATUS FOR PROTECTING A SURFACE

(71) Applicant: Rapid Response Systems, LLC, Madison, WI (US)

(72) Inventors: Jennifer R. Meyer, Cottage Grove, WI (US); Mathew W. Sayre, Fort Atkinson, WI (US); David R. Meyer, Cottage Grove, WI (US)

(73) Assignee: Rapid Response Systems, LLC, Madison, WI (US)

( * ) Notice: Subject to any disclaimer, the term of this patent is extended or adjusted under 35 U.S.C. 154(b) by 0 days.

(21) Appl. No.: 17/736,286

(22) Filed: May 4, 2022

(65) Prior Publication Data

US 2023/0358067 A1 Nov. 9, 2023

(51) Int. Cl.

| | |
|---|---|
| ***E04H 9/14*** | (2006.01) |
| ***F41H 5/013*** | (2006.01) |
| ***F41H 5/24*** | (2006.01) |
| ***E04H 9/04*** | (2006.01) |
| ***E06B 9/00*** | (2006.01) |
| ***E06B 9/02*** | (2006.01) |

(52) U.S. Cl.

CPC ................. *E04H 9/14* (2013.01); *E04H 9/04* (2013.01); *E06B 9/00* (2013.01); *E06B 9/02* (2013.01); *F41H 5/013* (2013.01); *F41H 5/24* (2013.01); *E06B 2009/005* (2013.01)

(58) Field of Classification Search

CPC ..... E04H 9/04; E04H 9/14; E06B 9/00; E06B 9/02; E06B 2009/005; F41H 5/013; F41H 5/24

See application file for complete search history.

(56) References Cited

U.S. PATENT DOCUMENTS

| | | | | |
|---|---|---|---|---|
| 5,918,430 A * | 7/1999 | Rowland | E06B 3/28 | 52/202 |
| 6,293,059 B1 * | 9/2001 | Goodwin | E06B 9/02 | 52/712 |
| 6,393,777 B1 * | 5/2002 | Renfrow | E06B 9/02 | 248/475.1 |
| 6,502,355 B1 * | 1/2003 | Bori | E06B 9/02 | 248/363 |
| 6,848,492 B2 * | 2/2005 | Thomas | E06B 3/28 | 160/368.1 |

(Continued)

FOREIGN PATENT DOCUMENTS

| | | | |
|---|---|---|---|
| KR | 20140105282 A * | 9/2014 | |
| WO | WO-2007133060 A2 * | 11/2007 | E06B 9/02 |

*Primary Examiner* — Jessie T Fonseca

(74) *Attorney, Agent, or Firm* — von Briesen & Roper, s.c.

(57) ABSTRACT

A foundation for a system for protecting a surface is disclosed. The foundation comprises a base, a suction assembly, a shield and one or more supports. The suction assembly may include a suction member having a rim, and a pump. The suction member is configured to be releasably sealed against the surface. The shield may be mounted to the outer face of the base. The shield is disposed opposite to the suction member and is configured to obstruct penetration by a fastener into the portion of the outer face covered by the shield. The one or more supports are mounted to the outer face. Each support includes a ledge that extends outward from the base. Also disclosed is a system for boarding-up a window disposed in a structure.

20 Claims, 8 Drawing Sheets

(56) References Cited

U.S. PATENT DOCUMENTS

| | | | | |
|---|---|---|---|---|
| 7,389,615 | B1 * | 6/2008 | Kelley | E06B 9/02<br>248/231.9 |
| 7,665,706 | B2 * | 2/2010 | Chien | F16B 47/006<br>248/363 |
| 9,234,381 | B2 * | 1/2016 | Wexler | E06B 3/28 |
| 10,597,934 | B2 * | 3/2020 | Gilbert | E06B 9/02 |
| 11,434,689 | B1 * | 9/2022 | Golla | E06B 9/01 |
| 2002/0184841 | A1 * | 12/2002 | Diamond | E06B 9/02<br>52/203 |
| 2008/0190064 | A1 * | 8/2008 | Craig | E06B 9/02<br>52/584.1 |
| 2013/0180188 | A1 * | 7/2013 | Motosko | F16B 33/00<br>411/366.1 |
| 2013/0269271 | A1 * | 10/2013 | Webb | E06B 9/02<br>52/698 |
| 2015/0107169 | A1 * | 4/2015 | Scott | E06B 9/02<br>52/202 |
| 2015/0184444 | A1 * | 7/2015 | Wexler | E06B 7/26<br>52/203 |

* cited by examiner

SECURITY APPARATUS FOR PROTECTING A SURFACE

TECHNICAL FIELD

The present disclosure generally relates to systems to protect windows in a structure, and more particularly, a system for boarding-up windows.

BACKGROUND

During inclement weather (for example, wind storms, hail storms), civil disturbances, vandalism or trespass, objects may be hurled against the glass of the windows of a building and may break or damage the glass.

To prevent such breakage or damage, property owners may board-up the windows of the building. To do so, boards are placed over the glass and secured to the wall or door of the building by interference fit or, more typically, nailing or screwing bolts through the board and into the wall or door in which the window is disposed. While this may prevent the window glass from breaking, these protective measures damage the structure and appearance of the wall or door because screws/nails tear into the structure of the wall/door when the boards are installed and tear away material from the wall/door when the boards are taken down and the screws/nails are removed. Interference fit clips only provide secure protection for the window glass when tightly wedged between the board and the wall/door frame around the glass. This interference fit tears and abrades the surface of the wall/door frame. Each time the boards are removed, damage to the wall or door is inevitable. Holes, splintering, cracking and the like in brick, grout, wood, aluminum siding etc. from the fasteners must be filled so rain and moisture do not get in and cause rot or degradation of the building material. Similarly, abrasion and recesses in the building material around the window from interference clips must be repaired. Over time, such repairs tend to prematurely age the appearance of the building, and if not done correctly may accelerate degradation of the structure itself. A better method of protecting windows is needed.

SUMMARY OF THE DISCLOSURE

In one aspect of the present disclosure, A foundation for a system for protecting a surface is disclosed. The foundation comprises a base, a suction assembly, a shield and one or more supports. The base has an inner face and an outer face disposed opposite to the outer face. The suction assembly is mounted to the inner face. The suction assembly may include a suction member having a rim, and a pump. The suction member may be concave in shape and configured to form a chamber with the surface when the surface is disposed against the rim. The suction member is configured to be releasably sealed against the surface when air is removed from the chamber. The pump is in fluid communication with the chamber. The pump is configured to draw air out of the chamber. The shield may be mounted to the outer face and cover at least a portion of the outer face. The shield is disposed opposite to the suction member and is configured to obstruct penetration by a fastener into the portion of the outer face covered by the shield. The one or more supports are mounted to the outer face. Each support includes a ledge that extends outward from the base.

In another aspect of the disclosure, a method of boarding-up a window disposed in a structure is disclosed. The window includes a surface. The structure may be a wall, door or roof, and the surface may be glass or mirror. The method may comprise attaching with suction a plurality of foundations on the surface. Each foundation may include a base, a suction assembly, a shield and one or more supports. The base has an inner face and an outer face disposed opposite to the outer face. The suction assembly is mounted to the inner face. The suction assembly may include a suction member and a pump. The suction member has a rim. The suction member may be concave in shape and is configured to form a chamber with the surface when the surface is disposed against the rim. The suction member is configured to be releasably sealed against the surface when air is removed from the chamber. The pump is in fluid communication with the chamber and is configured to draw air out of the chamber. The shield is mounted to the outer face and covers at least a portion of the outer face. The shield is disposed opposite to the suction member and is configured to obstruct penetration by a fastener into the portion of the outer face covered by the shield. The one or more supports are mounted to the outer face. Each support may include a ledge that extends outward from the base. The method may further include disposing a first board-sheet on one or more supports of a first foundation of the plurality of foundations, securing the first board-sheet to the surface by affixing with fasteners the first board-sheet to the base of the first foundation, disposing the first board-sheet on a first support of a second foundation of the plurality of foundations, and securing the first board-sheet to the surface by affixing with fasteners the first board-sheet to the base of the second foundation.

In yet another aspect of the disclosure, a system is disclosed for boarding-up a window disposed in a structure. The window includes a surface. The structure may be a wall, a door or roof, and the surface may be glass or mirror. The system may comprise: a plurality of foundations mounted on a surface, and a first board-sheet. Each foundation may comprise: a base, a suction assembly, a shield, and one or more supports. The base may have an inner face and an outer face disposed opposite to the outer face. The suction assembly may be mounted to the inner face. The suction assembly may include a suction cup and a pump. The suction cup has a rim. The suction cup defines a chamber with the surface when the surface is disposed against the rim. The suction cup is configured to be releasably sealed against the surface when air is removed from the chamber. The pump is in fluid communication with the chamber. The pump is configured to draw air out of the chamber. The shield is mounted to the outer face and covers at least a portion of the outer face. The shield is disposed opposite to the suction cup and is configured to obstruct penetration by a nail or a screw into the portion of the outer face covered by the shield. The shield may be a metal plate. The one or more supports may be mounted to the outer face. Each support may define a channel and include a ledge disposed between a first and second sidewalls. The ledge extends outward from the base and is disposed along an outer face edge of the base. The first board-sheet has a first end and a second end. The first end of the first board-sheet disposed in a first support of each of the first and second foundations, and the second end disposed in a first support of each of the third and fourth foundations.

DETAILED DESCRIPTION

Figure 1:
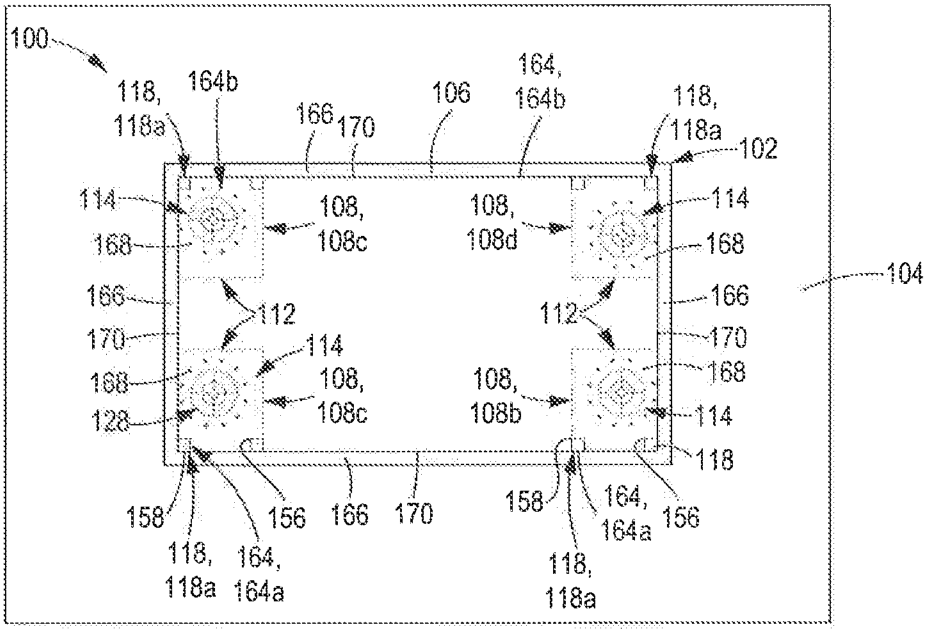
FIG. 1 is diagram of an exemplary embodiment of a system for boarding up a window utilizing the teachings of this disclosure.
Figure 2:
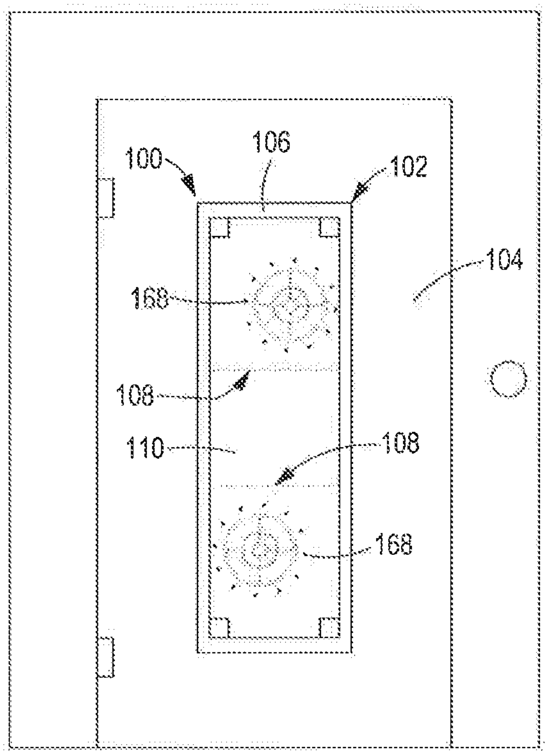
FIG. 2 is diagram of another exemplary embodiment of a system for boarding up a window utilizing the teachings of this disclosure.

Reference will now be made in detail to specific embodiments or features, examples of which are illustrated in the accompanying drawings. Generally, corresponding reference numbers will be used throughout the drawings to refer to the same or corresponding parts, unless otherwise specified.

FIGS. 1-4 illustrate examples of a system 100 for boarding-up a window 102 disposed in a structure 104. The structure 104 may be, for example, a wall, a door or a roof. The window 102 includes a surface 106 and may also include mullions, or the like. The surface 106 may be glass, mirror, or the like.

The exemplary system 100 includes a one or more foundations 108 mounted on the surface 106, and one or more board-sheets 110. In the embodiments discussed herein, the foundations 108 are not affixed (e.g., screwed into, nailed onto, interference fit with, or the like) to the structure 104 in which the window 102 is disposed.

Figure 5:
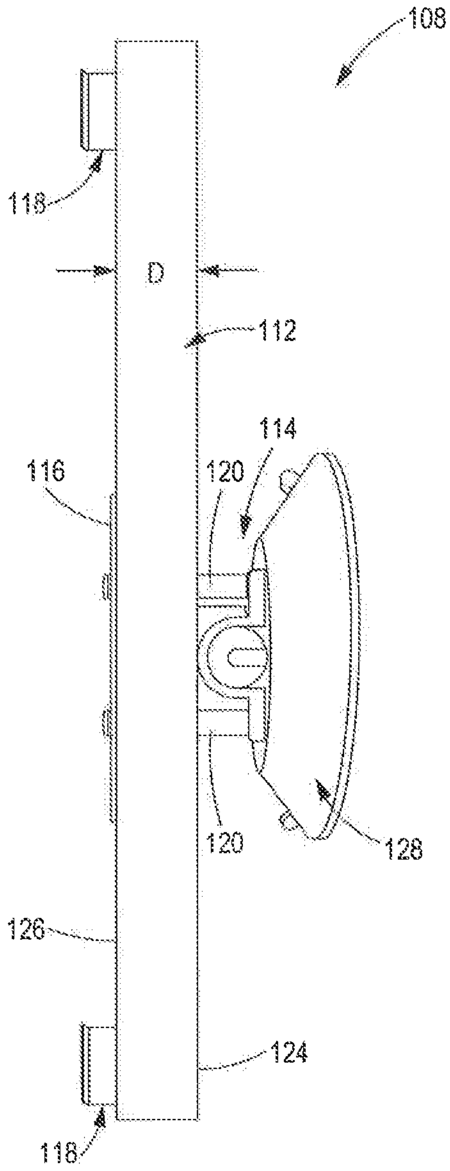
FIG. 5 illustrates a top perspective view of a foundation.
Figure 6:
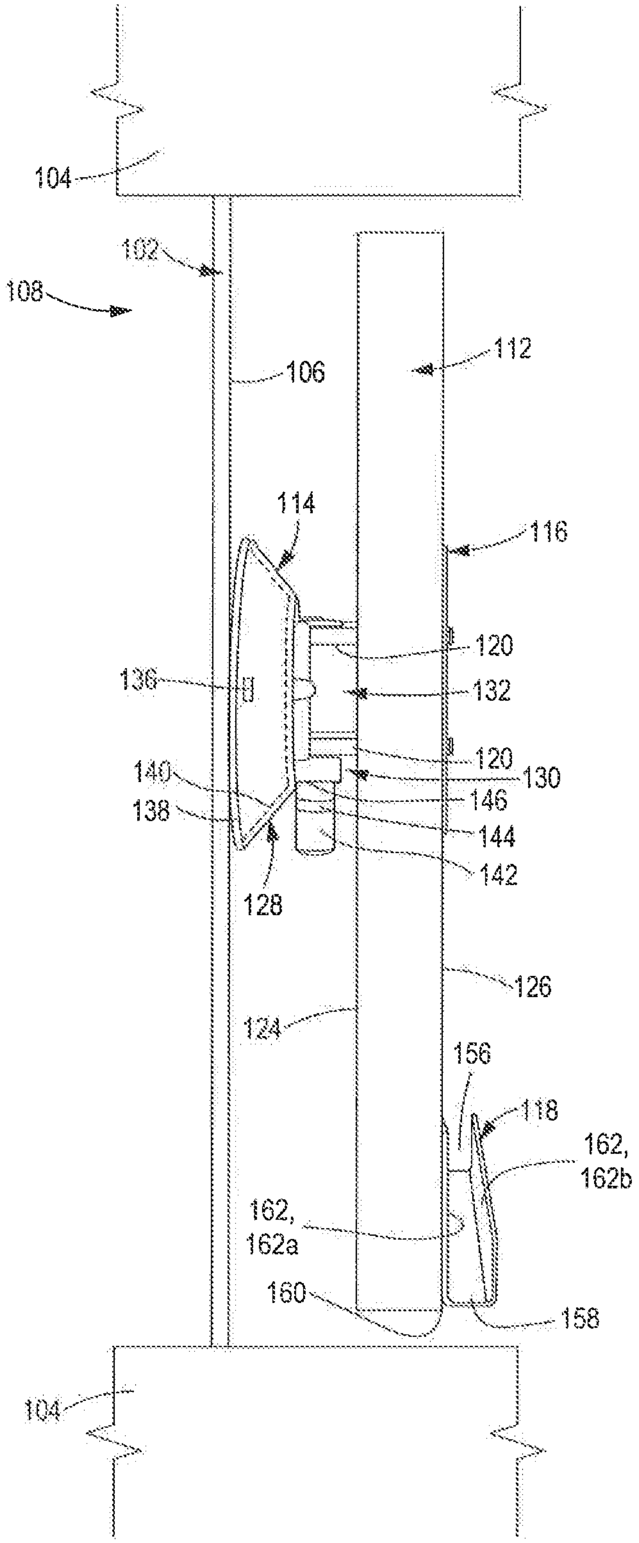
FIG. 6 illustrates a side perspective view of the foundation of FIG. 5 mounted on a surface of a window disposed in a structure.
Figure 7:
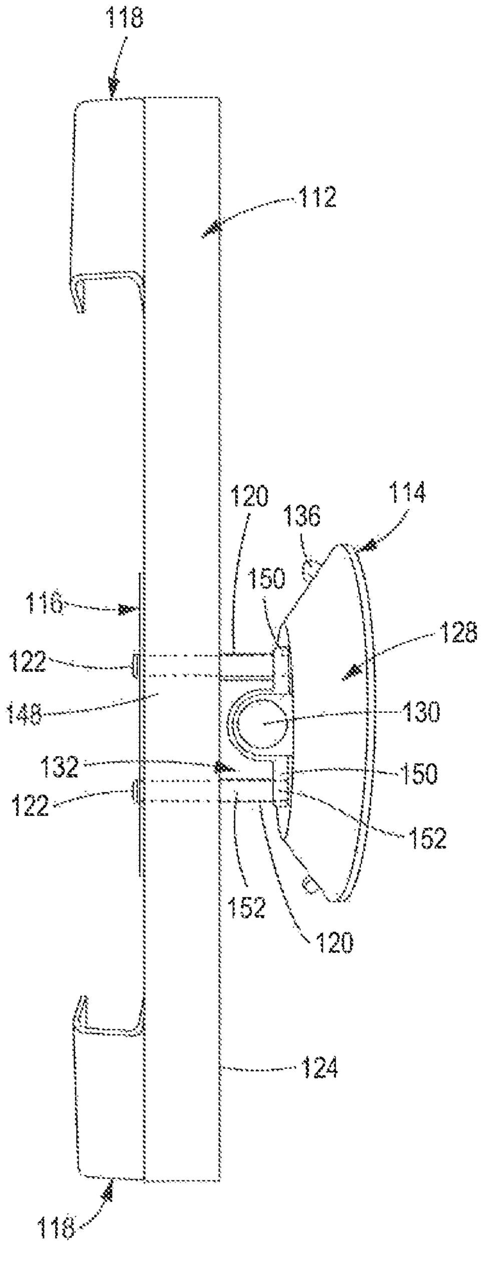
FIG. 7 illustrates a bottom perspective view of the foundation of FIG. 5.
Figure 8:
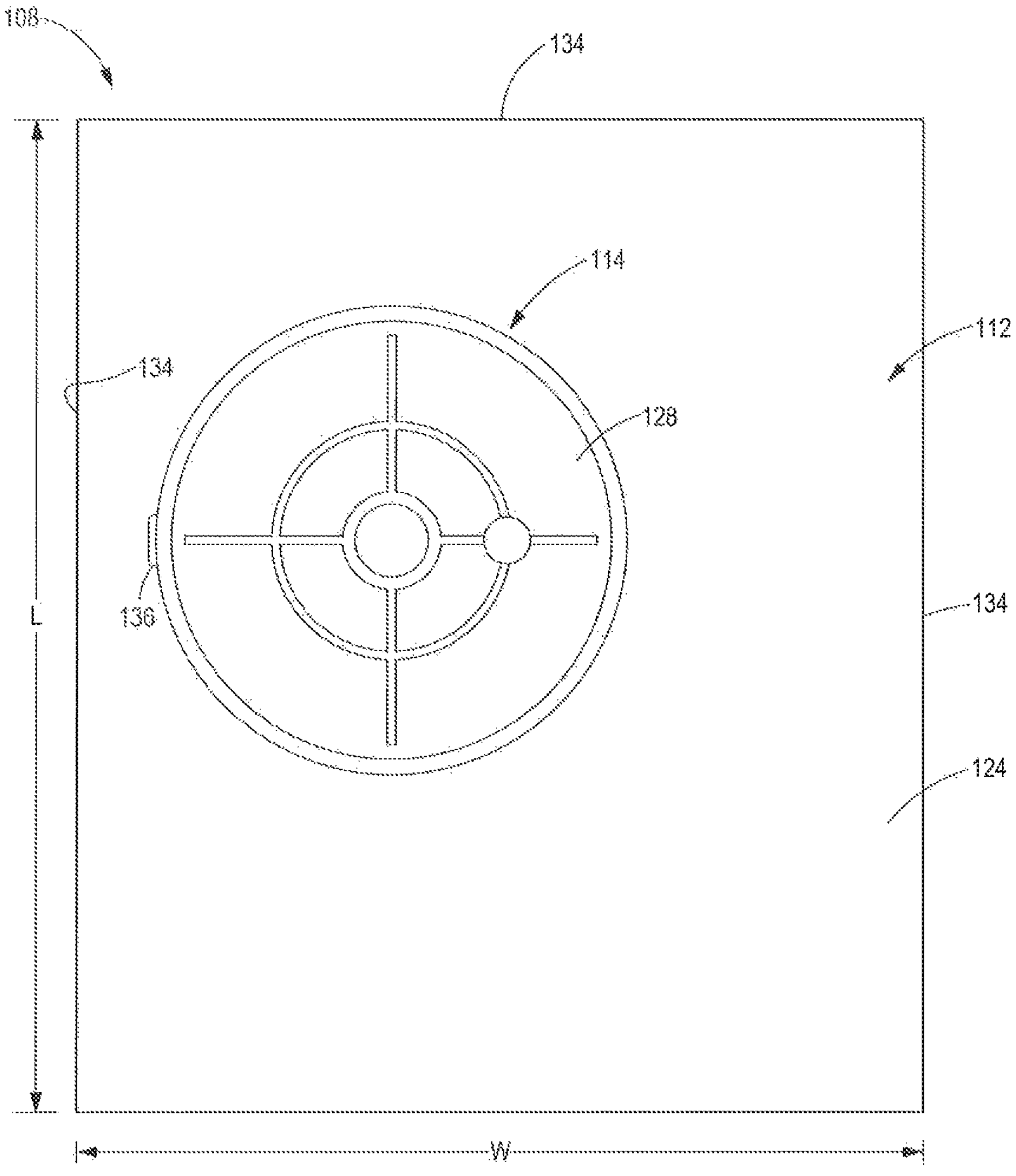
FIG. 8 illustrates the inner face of the foundation of FIG. 5.
Figure 9:
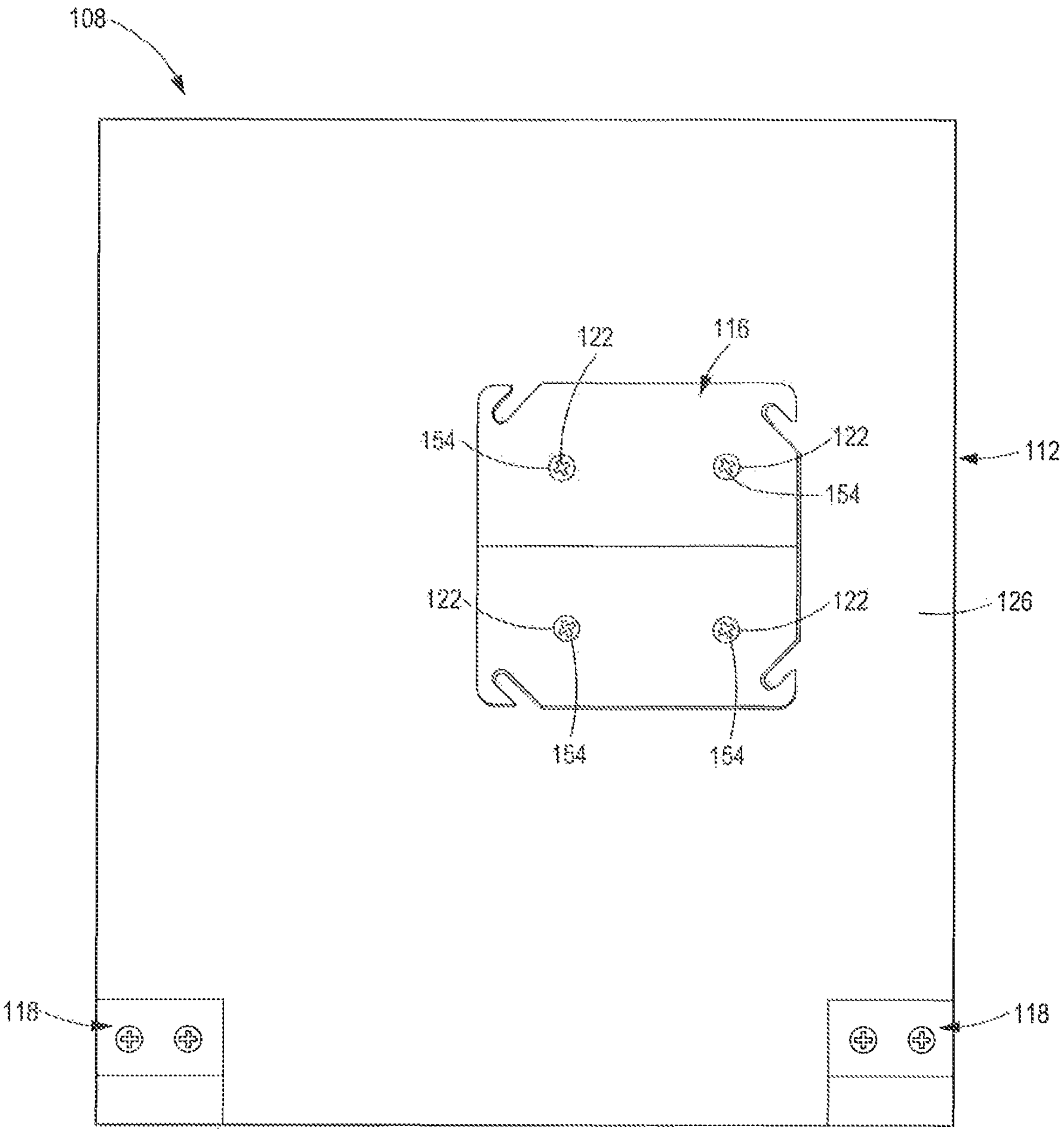
FIG. 9 illustrates the outer face of the foundation of FIG. 5.

FIGS. 5-9 illustrate an exemplary embodiment of the foundation 108. As best seen in FIGS. 5-7, the foundation 108 includes a base 112, a suction assembly 114 (see also FIG. 8), a shield 116 (see also FIG. 9), and one or more supports 118 (FIGS. 5-7 and 9). The foundation 108 may further include one or more cylinders 120 (5-7) and one or more threaded members 122 (FIG. 9).

Referring now to FIG. 5, the base 112 may have an inner face 124 and an outer face 126 disposed opposite to the inner face 124. The outer face 126 of the base 112 is configured for secure engagement with one or more board-sheets 110 (FIGS. 1-4). For example, in one embodiment, the outer face 126 (FIG. 5) is generally flat and the base 112 is configured to receive and securely hold fasteners 168 (screws, nails, or like). In an embodiment, the base 112 may be wood, plywood, a medium-density fibreboard (MDF) or the like. In one further refinement, the base 112 may have a depth (thickness) D in the range of about 0.75 inches (1.9 cm) to about 1.25 inches (3.2 cm). The dimensions of the board may vary depending on the dimensions of the surface, however, in one embodiment the length L (FIG. 8) of the base 112 may be in the range of about 8 inches (20.3 cm) to about 20 inches (50.8 cm) and the width W may be in the range of about 8 inches (20.3 cm) to about 20 inches (50.8 cm).

Referring now to FIG. 6, the suction assembly 114 is mounted to the inner face 124 of the base 112. The suction assembly 114 may include a suction member 128, a pump 130 and a cover 132. The suction assembly 114 may be positioned in any appropriate area of the inner face 124 of the base 112. For example, in one embodiment, the suction assembly 114 is not centered on the inner face 124, but is instead offset toward an edge on the perimeter of the inner face 124 (an "inner face edge" 134). For example, as shown in FIG. 8, the suction assembly 114 may be closer to one or more inner face edges 134 than to other inner face edges 134. Such disposition of the suction assembly 114 may facilitate release of suction from the suction member 128 by a user because the tab 136, which releases suction upon manipulation by a user, is more easily reached when it is disposed close to the inner face edge 134. To release suction, a user may reach under the base 112 to the inner face 124 and manipulate the tab 136 of the suction member 128 to release the seal and then remove the foundation 108 from the surface 106 (FIG. 6) on which it is mounted.

The suction member 128 includes a rim 138 (FIG. 6). The suction member 128 is generally concave in shape and is configured to form a chamber 140 with the surface 106 when the surface 106 is disposed against the rim 138. The suction member 128 is configured to be releasably sealed against the surface 106 when air is removed from the chamber 140. In an embodiment, the suction member 128 may be a suction cup. The suction member 128 may further include a tab 136 configured to release the seal of the suction member 128 from the surface 106 when the tab 136 is lifted or otherwise manipulated. The suction member 128 includes an inlet 141 (see FIG. 8). An air filter 143 or the like may be disposed in the inlet 141. In an embodiment, the suction member 128 may be made of rubber or other suitable material that does not damage the surface 106.

The pump 130 is in fluid communication with the chamber 140 via the inlet 141 and is in fluid communication with outside the chamber 140. The pump 130 includes a pump actuator 142. The pump 130 is configured to draw air out of the chamber 140 to the environment when activated by the pump actuator 142. The pump actuator 142 may include a display 144 of the level of suction in the suction member 128. For example, in one embodiment such as the one shown in FIG. 6, the closer the display 144 (e.g., a visual marker) is disposed to the full suction position 146, the greater the amount of suction acting on the surface 106. The farther the display 144 (e.g., a visual marker) of FIG. 6 moves away from the full suction position 146 (over time), the lower the amount of suction acting on the surface 106. In an embodiment, the pump 130 may be disposed between the cover 132 and the suction member 128.

The cover 132 (FIG. 7) may be disposed adjacent to the inner face 124. The cover 132 includes a body 148. The cover 132 may further include a collar 150. The collar 150 extends outward from the body 148 and includes one or more bores 152. Each bore 152 is configured to receive one of the threaded members 122 (FIG. 9). In one embodiment, the cover 132 may be aluminum or the like to provide durability in the event of very hot or very cold weather conditions.

The shield 116 (FIG. 9) is mounted to the base 112. The shield 116 may include one or more apertures, slots, cutouts, holes or grooves (collectively, each is referred to herein as an "aperture" 154) extending therethrough. The aperture 154 is configured to receive the threaded member 122 that is utilized to securely mount the shield 116 to the base 112. For example, the shield 116 may be mounted to the outer face 126 of the base 112. When mounted to the base 112, the shield 116 covers at least a portion of the base 112, for example a portion of the outer face 126 of the base 112. The shield 116 is mounted to be disposed opposite to the suction assembly 114 (in particular the pump 130, cover 132 and the suction member 128) (see FIG. 6) and is configured to obstruct penetration by a fastener 168 (e.g., a screw, nail or the like) into the portion of the base 112 (e.g., portion of the outer face 126) that is covered by the shield 116. In an embodiment, the shield 116 may be made of metal, galvanized metal or other suitable material. In a refinement, the shield 116 may be a metal plate.

As shown in FIG. 6, the support 118 is mounted to the base 112. For example, the support 118 may be mounted to the outer face 126. The support 118 may define a channel 156. The support 118 includes a ledge 158 that extends outward from the base 112. In an embodiment, the ledge 158 may be disposed along a perimeter edge of the outer face 126 of the base 112 (an "outer face edge" 160). The support 118 may further include one or more sidewalls 162. In one embodiment such as the embodiment shown in FIG. 6, the support 118 may be a J-hook and the ledge 158 may be disposed between a first sidewall 162*a* and a second sidewall 162*b*. In such an embodiment, the support 118 may be mounted to the base 112 by the first sidewall 162*a*. In another embodiment, the support 118 may be an L-hook and the ledge 158 and the first sidewall 162 may form an angle (e.g., a right angle) and the support 118 may be mounted to the base 112 by the first sidewall 162*a*. The channel 156 is configured to receive an end 164 (see FIG. 1) of a board-sheet 110. In one embodiment, the support 118 may be made of metal (e.g., stainless steel).

Referring now to FIG. 7, the cylinders 120 may be disposed between the base 112 and the suction member 128 and are configured to receive a threaded member 122 (e.g. a screw). Each cylinder 120 may be disposed between the inner face 124 and the suction member 128 and is disposed over one of the bores 152 in the collar 150. In one embodiment, the cylinder 120 may be galvanized to provide durability in the event of inclement weather.

The threaded member 122 may be a screw or the like. In an embodiment, the threaded members 122 may be stainless steel or the like. In one embodiment, the threaded member 122 (FIG. 7) may extend through one of the apertures 154 of the shield 116, through the base 112, through one of the cylinders 120, and into one of the bores 152 in the collar 150 of the cover 132 to mount the shield 116 and the suction assembly 114 to the base 112.

The board-sheet 110 (see for example FIG. 1) has a first end 164*a* and a second end 164*b*. In an embodiment, the first end 164*a* may be disposed on one or more supports 118 (e.g., in the channel 156 of such support 118) of a foundation 108. The second end 164*b* may be disposed in one or more supports 118 (e.g., in the channel 156 of such support 118) of another foundation 108. For example, in the embodiment of FIG. 1, the first end 164*a* of the first board-sheet 110 may disposed in a first support 118*a* of each of the first and second foundations 108*a*, 108*b*, and the second end 164*b* may be disposed in a first support 118*a* of each of the third and fourth foundations 108*c*, 108*d*, wherein a gap 166 is formed between the first board-sheet 110 and the structure 104. In an embodiment, the board-sheet 110 may be wood, plywood, a medium-density fibreboard (MDF) or other suitable material for affixing to the base 112. The depth or thickness of the board-sheet 110 may vary with application, however, in one embodiment, the board-sheet 110 utilized may have a depth or thickness in the range of about 0.5 inches (1.27 cm) to about 1.0 inches (2.54 cm).

Also disclosed is a method of boarding-up a window 102 disposed in a structure 104, the window 102 including a surface 106, wherein the structure 104 is a wall, a door or a roof, and the surface 106 is glass or mirror or the like. The method may comprise attaching with suction one or more foundations 108 on the surface 106, each foundation 108 including: a base 112 having an inner face 124 and an outer face 126 disposed opposite to the inner face 124, a suction assembly 114 mounted to the inner face 124, a shield 116 and one or more supports 118. The suction assembly 114 may include: a suction member 128 and a pump 130. The suction member 128 has a rim 138. The suction member 128 may be generally concave in shape and is configured to form a chamber 140 with a surface 106 when the surface 106 is disposed against the rim 138. The suction member 128 is configured to be releasably sealed against the surface 106 when air is removed from the chamber 140. The pump 130 is in fluid communication with the chamber 140. The pump 130 is configured to draw air out of the chamber 140 when activated. The shield 116 may be mounted to the outer face 126 and may cover at least a portion of the outer face 126. The shield 116 is disposed opposite to the suction member 128 and is configured to obstruct penetration by a fastener 168 through the shield 116 and into the portion of the outer face 126 covered by the shield 116. The one or more supports 118 may be mounted to the outer face 126. Each support 118 includes a ledge 158 that extends outward from the base 112. The method may further comprise disposing a first board-sheet 110 on a first support 118 of a first foundation 108, and securing the first board-sheet 110 over the surface 106 by affixing with fasteners 168 the first board-sheet 110 to the base 112 of the first foundation 108. The method may further comprise disposing the first board-sheet 110 on a first support 118 of a second foundation 108, securing the first board-sheet 110 over the surface 106 by affixing with fasteners 168 the first board-sheet 110 to the base 112 of the second foundation 108.

INDUSTRIAL APPLICABILITY

In general, the foregoing disclosure finds utility in the boarding up of the surface 106 of a window 102 disposed in a structure 104 (e.g., a wall, door, roof) to protect such surface 106 (e.g., glass, mirror or the like) from damage (cracking, shattering, breaking, etc.)

The system 100 disclosed herein is particularly advantageous because while the foundation(s) 108 and the board-sheet(s) 110 mounted thereon are secured to the surface 106 of the window 102 via the suction member(s) 128, the board-sheet(s) 110 and the foundation(s) 108 are not affixed to the portion of the structure 104 in which the window 102 is disposed and therefore do not damage the structure 104 (e.g., penetration, surface abrasion, holes, splintering/cracking or the like) during installation and/or removal. More specifically, the disclosed system 100 and foundations 108 do not use penetration into the structure 104 by fasteners (e.g., screws, nails or the like) or abrasion by interference fit clips biting against the structure 104 to secure the board-sheets 110 over the surface 106. To the contrary, the structure 104 in which the window 102 is disposed may be free of contact or engagement with the foundation(s) 108 that secure the board-sheets 110 over the surface 106. In addition, the portion of the structure 104 may also be free of contact or fastening engagement with the board-sheets 110 mounted on the foundations 108 when a gap 166 is disposed between the board-sheet 110 and such portion of the structure 104.

Figure 10:
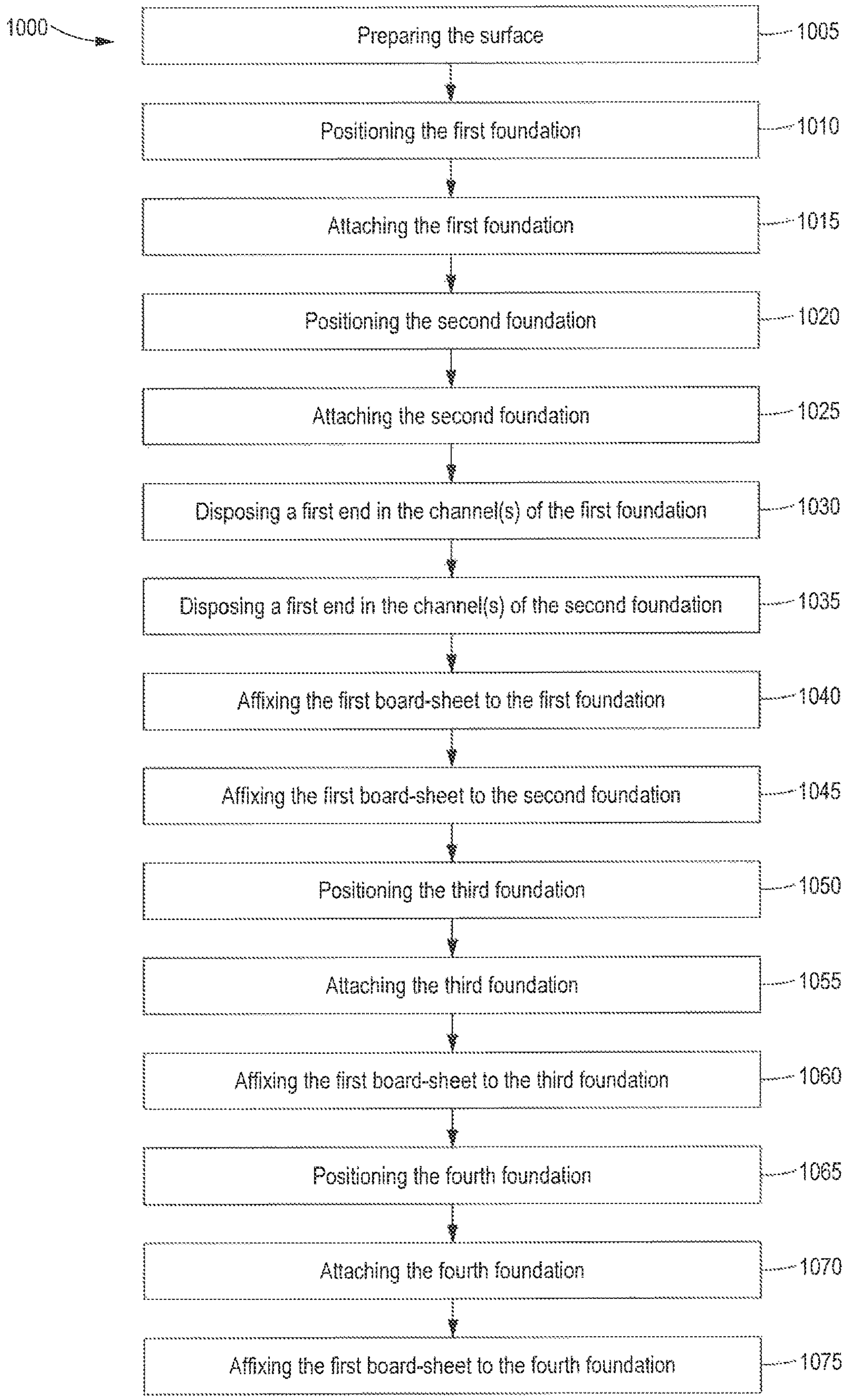
FIG. 10 illustrates blocks of an exemplary method according to this disclosure.

Referring now to FIG. 10 an exemplary flowchart is illustrated showing sample blocks which may be followed in one exemplary method 1000 of boarding-up a window 102 disposed in a structure 104 (FIG. 1), where the structure 104 is a wall, door or roof, and the window 102 includes a surface 106 that is glass, mirror or the like. For the purpose of discussion, an exemplary embodiment will be discussed in which a plurality of foundations 108, namely first, second, third and fourth foundations 108(*a-d*), may be utilized to secure a first board-sheet 110*a* over the surface 106. The method of installation is flexible and may be practiced with more or less than the number of blocks discussed, more or less than the quantity of foundations 108, and one or more board-sheets 110 spanning across the surface 106. Furthermore, the blocks of all methods described herein can be performed in any suitable order unless otherwise indicated herein or otherwise clearly contradicted by context.

Block 1005 of the exemplary method 1000 may comprise preparing the surface 106. The preparing may include washing the surface 106. The preparing may also include drying (or letting air dry) the surface 106 to remove dirt, dust or other material that may effect the strength of the suction of the suction member 128 when installed on the surface 106.

Block 1010 comprises positioning the first foundation 108*a* (illustrated in FIG. 1) on the surface 106 so that the channels 156 defined by one or more supports 118 of the first foundation 108*a* are oriented to receive a first end 164*a* of the first board-sheet 110*a*.

Block 1015 comprises attaching with suction the first foundation 108 to the surface 106 by creating a seal between the suction member 128 of the first foundation 108*a* and the surface 106. To create the seal, the rim 138 of the suction member 128 is placed generally flushly on the surface 106 and the pump 130 is activated to remove air from the chamber 140 formed by the suction member 128 and the surface 106. This creates a low pressure region inside the chamber 140 of the suction member 128. The atmospheric pressure outside the suction member 128 presses down on the low pressure area inside the chamber 140 of the suction member 128 and creates a suction-based seal.

Block 1020 comprises positioning the second foundation 108*b* on the surface 106 so that the channels 156 that are defined by one or more supports 118 of the second foundation 108*b* are oriented to receive the first end 164*a* of the first board-sheet 110*a*.

Block 1025 comprises attaching with suction the second foundation 108*b* to the surface 106 by creating a seal between the suction member 128 of the second foundation 108*b* and the surface 106. To create the seal, the rim 138 of the suction member 128 is placed generally flushly on the surface 106 and the pump 130 of the second foundation 108*b* is activated to remove air from the chamber 140 formed by the suction member 128 and the surface 106. This creates a low pressure region inside the chamber 140 of the suction member 128 of the second foundation 108*b*. The atmospheric pressure outside the suction member 128 presses down on the low pressure area inside the chamber 140 of the suction member 128 and creates a suction-based seal.

Block 1030 comprises disposing a first end 164*a* of the first board-sheet 110*a* in the channel(s) 156 of the one or more supports 118 of the first foundation 108*a*.

Block 1035 comprises disposing the first end 164*a* of the first board-sheet 110*a* in the channel(s) 156 of the one or more supports 118 of the second foundation 108*b*.

Block 1040 comprises securing the first board-sheet 110*a* over the surface 106 by affixing (e.g., nailing, screwing or the like) with fasteners 168 the first board-sheet 110*a* to the base 112 of the first foundation 108*a*. In doing so, the first board-sheet 110*a* is not affixed to, or in fastening engagement with, the portion of the structure 104 in which the window 102 is disposed, and the foundation 108*a* is affixed to the surface 106 (of the window 102) but is not affixed to the portion of the structure 104 in which the window 102 is disposed. In other words, the structure 104 is free of penetration or other securing engagement by fasteners 168 used to secure the first board-sheet 110*a* over the window 102 or to secure the foundation 108 to the surface 106.

Block 1045 comprises securing the first board-sheet 110*a* over the surface 106 by affixing (e.g., nailing, screwing or the like) with fasteners 168 the first board-sheet 110*a* to the base 112 of the second foundationa108*b*. The first board-sheet 110*a* is not affixed to, or in fastening engagement with, the portion of the structure 104 in which the window 102 is disposed, and the foundation 108*b* is affixed to the surface 106 (of the window 102) but is not affixed to the portion of the structure 104 in which the window 102 is disposed. In other words, the structure 104 is free of penetration or other securing engagement by fasteners 168 used to secure the first board-sheet 110*a* over the window 102 or to secure the foundation 108 to the surface 106.

Block 1050 comprises positioning the third foundation 108*c* on the surface 106 so that the channel(s) 156 defined by the one or more supports 118 of the third foundation 108*c* are oriented to receive a second end 164*b* of the first board-sheet 110*a*.

Block 1055 comprises attaching with suction the third foundation 108*c* to the surface 106 by creating a seal between the suction member 128 of the third foundation 108*c* and the surface 106. To create the seal, the rim 138 of the suction member 128 is placed generally flushly on the surface 106 and the pump 130 of the third foundation 108*c* is activated to remove air from the chamber 140 formed by the suction member 128 and the surface 106. This creates a low pressure region inside the chamber 140 of the suction member 128 of the third foundation 108*c*. The atmospheric pressure outside the suction member 128 presses down on the low pressure area inside the chamber 140 of the suction member 128 and creates a suction-based seal.

Block 1060 comprises securing the first board-sheet 110*a* over the surface 106 by affixing with fasteners 168 the first board-sheet 110*a* to the base 112 of the third foundation 108*c*.

Block 1065 comprises positioning the fourth foundation 108*d* so that the channel(s) 156 defined by the one or more supports 118 of the fourth foundation 108*d* are oriented to receive the second end 164*b* of the first board-sheet 110*a*.

Block 1070 comprises attaching with suction the fourth foundation 108*d* to the surface 106 by creating a seal between the suction member 128 of the fourth foundation 108*d* and the surface 106. To create the seal, the rim 138 of the suction member 128 is placed generally flushly on the surface 106 and the pump 130 of the fourth foundation 108*d* is activated to remove air from the chamber 140 formed by the suction member 128 and the surface 106. This creates a low pressure region inside the chamber 140 of the suction member 128 of the fourth foundation 108*d*. The atmospheric pressure outside the suction member 128 presses down on the low pressure area inside the chamber 140 of the suction member 128 and creates a suction-based seal.

Block 1075 comprises securing the first board-sheet 110*a* over the surface 106 by affixing with fasteners 168 the first board-sheet 110*a* to the base 112 of the fourth foundation 108*d*. FIG. 1 illustrates an example of an embodiment a first board-sheet 110*a* secured over the surface 106 by four foundations 108(*a-d*). In one embodiment, one or more ledges 158 of the first foundation 108*a* may be adjacent to a first end 164*a* of the first board-sheet 110*a* and a first ledge 158*a* of the second foundation 108*b* may be adjacent to the first end 164*a* of the first board-sheet 110*a*, wherein one or more ledges 158 of the third foundation 108*c* may be adjacent to the second end 164*b* of the first board-sheet 110*a* and a first ledge 158*a* of the fourth foundation 108*d* may be adjacent to the second end 164*b* of the first board-sheet 110*a*, the first end 164*a* opposite to the second end 164*b*.

Figure 3:
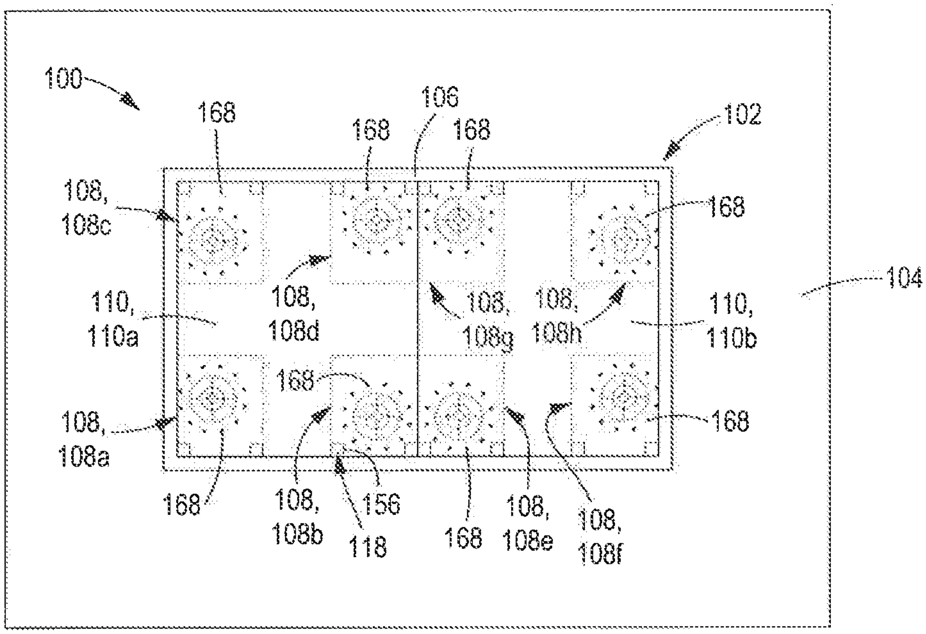
FIG. 3 is diagram of another exemplary embodiment of a system for boarding up a window utilizing the teachings of this disclosure.
Figure 4:
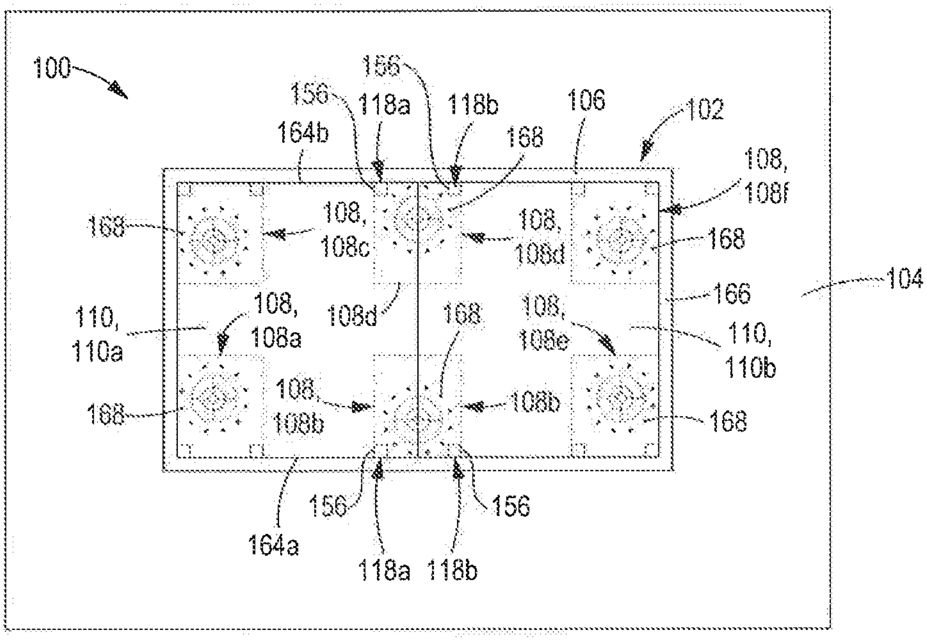
FIG. 4 is diagram of another exemplary embodiment of a system for boarding up a window utilizing the teachings of this disclosure.

It may be desirable to perform one or more of the blocks shown in FIG. 10 in an order different from that depicted. As noted above the method 1000 may be adjusted to utilize greater or fewer quantity of foundations 108. For example, in some embodiments, it may be desirable to utilize a greater quantity of board-sheets 110 to span a surface 106. For example, as shown in FIGS. 3 and 4, two board-sheets 110(*a-b*) may be utilized in series to span a surface 106. In the embodiment illustrated in FIG. 3, four foundations 108 (*a-d*) are utilized per board-sheet 110(*a-b*) (one foundation 108 per corner) for a total of eight foundations 108 (*a-h*). Whereas, in the embodiment illustrated in FIG. 4, six foundations 108 (*a-f*) in total are used because each of the first and second board-sheets (110(*a-b*) "share" two of the foundations (108*b* and 108*d*). In such a scenario, the first board-sheet 110*a* may be disposed in a channel 156 of a first support 118*a* of a shared foundation (108*b* or 108*d*) and the second board-sheet 110*b* may be disposed in a channel 156 of a second support 118*b* of the shared foundation (108*b* or 108*d*).

As may be best seen in the embodiment of FIG. 1, when the first board-sheet 110*a* is installed, there may be a gap 166 between the outer edges (at the perimeter) of the board-sheet ("board-sheet outer edge(s) 170") and the structure 104. For example, a gap 166 is formed between the first end 164*a* of the first board-sheet 110*a* and the structure 104, and/or the second end 164*b* of the first board-sheet 110*a* and the structure 104, and/or board-sheet outer edges 170*a* on first side of the first board-sheet 110*a* and the structure 104, and/or board-sheet outer edges 170 on a second side of the first board-sheet 110*a* and the structure 104. Gaps 166 facilitate maintenance of the suction, to the extent that any is needed, for a foundation 108 and removal of the foundations 108 when desired.

As discussed earlier, in an embodiment, the pump actuator 142 (see FIG. 6) may include a display 144 of the level of suction acting on the suction member 128. This allows a user to confirm when a good suction-seal is in place. In the embodiment illustrated in FIG. 6, the display 144 is a visual marker (e.g., a line) or flag indicative of suction strength (e.g., by relative position of the marker or flag to a designated full suction position 146). Such display 144 may be visible through the surface 106 when viewed from the opposite side of the surface 106 than that side which the foundation 108 is mounted on (e.g., viewed through a glass surface 106 from inside a building of which the structure 104 is part of). If the display 144 indicates that the suction strength is weakening, a user may activate the pump 130 via the pump actuator 142 to restore the appropriate level of suction. In one embodiment, access to the pump actuator 142 may be via the gap 166 (reaching into the gap 166 and around the base 112 to activate the pump actuator 142 disposed (indirectly) on the inner face 124 of the base 112). In one embodiment, the suction member 128 may have a suction-seal that provides a load capacity of up to about 150 pounds (68 kg) per foundation 108.

The foundations 108 may be removed from the surface 106 by accessing the tab 136 via the gap 166. The tab 136 may be manipulated to break to release the seal of the suction member 128 from the surface 106.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A foundation for a system for protecting a surface, the foundation comprising:
- a base having an inner face and an outer face disposed opposite to the outer face;
- a suction assembly mounted to the inner face, the suction assembly including:
  - a suction member having a rim, the suction member is concave in shape and configured to form a chamber with the surface when the surface is disposed against the rim, the suction member configured to be releasably sealed against the surface when air is removed from the chamber; and
  - a pump in fluid communication with the chamber, the pump configured to draw air out of the chamber; and
- a shield mounted to the outer face and covering at least a portion of the outer face, the shield disposed opposite to the suction member and configured to obstruct penetration by a fastener into the portion of the outer face covered by the shield; and
- one or more supports mounted to the outer face, each support including a ledge that extends outward from the base.

2. The foundation of claim 1, wherein the surface is glass or a mirror.

3. The foundation of claim 1, wherein the base is wood, plywood or medium-density fibreboard (MDF).

4. The foundation of claim 1, in which the suction assembly further includes a cover adjacent to the inner face, wherein the pump is disposed between the cover and the suction member.

5. The foundation of claim 4, in which the shield further includes one or more apertures extending therethrough, and the foundation further comprises:
- one or more cylinders disposed between the base and the suction member; and
- one or more threaded members, each threaded member extending through one of the apertures and through the base and one of the cylinders into the cover.

6. The foundation of claim 1, wherein the suction member is a suction cup.

7. The foundation of claim 1, wherein the shield is a metal plate.

8. The foundation of claim 1, in which the suction member includes a tab configured to release a seal of the suction member from the surface.

9. A method of boarding-up a window disposed in a structure, the window including a surface, wherein the structure is a wall or a door, and the surface is glass or a mirror, the method comprising:
- attaching with suction a plurality of foundations on the surface, each foundation including:
  - a base having an inner face and an outer face disposed opposite to the outer face;

a suction assembly mounted to the inner face, the suction assembly including:

a suction member having a rim, the suction member is concave in shape and configured to form a chamber with the surface when the surface is disposed against the rim, the suction member configured to be releasably sealed against the surface when air is removed from the chamber; and a pump in fluid communication with the chamber, the pump configured to draw air out of the chamber; and a shield mounted to the outer face and covering at least a portion of the outer face, the shield disposed opposite to the suction member and configured to obstruct penetration by a fastener into the portion of the outer face covered by the shield; and one or more supports mounted to the outer face, each support including a ledge that extends outward from the base;

disposing a first board-sheet on a first support of the one or more supports of a first foundation of the plurality of foundations;

securing the first board-sheet to the surface by affixing with fasteners the first board-sheet to the base of the first foundation;

disposing the first board-sheet on a first support of the one or more supports of a second foundation of the plurality of foundations; and securing the first board-sheet to the surface by affixing with fasteners the first board-sheet to the base of the second foundation.

10. The method of claim 9, wherein the first board-sheet is not affixed to the structure.

11. The method of claim 9, wherein the suction member is a suction cup.

12. The method of claim 9, in which each suction assembly further includes a cover adjacent to the inner face, in which the shield further includes one or more apertures extending therethrough, and in which each of the foundations further comprise:

one or more cylinders disposed between the base and the suction member; and one or more threaded members, each threaded member extending through one of the apertures and through the base and one of the cylinders into the cover.

13. The method of claim 9, wherein the ledge of each support is disposed along an outer face edge of the base.

14. The method of claim 9, wherein one or more ledges of the first foundation are adjacent to a first end of the first board-sheet and one or more ledges of the second foundation are adjacent to a second end of the first board-sheet, the first end opposite to the second end.

15. The method of claim 9, in which the plurality of foundations further includes a third foundation and a fourth foundation, the method further comprising:

disposing the first board-sheet on a first support of the one or more supports of the third foundation;

securing the first board-sheet to the surface by affixing with fasteners the first board-sheet to the base of the third foundation;

disposing the first board-sheet on a first support of the one or more supports of the fourth foundation; and securing the first board-sheet to the surface by affixing with fasteners the first board-sheet to the base of the fourth foundation, wherein the ledge of the first support of the one or more supports of the first foundation is adjacent to a first end of the first board-sheet and the ledge of the first support of the one or more supports of the second foundation is adjacent to the first end of the first board-sheet, wherein the ledge of the first support of the one or more supports of the third foundation is adjacent to a second end of the first board-sheet and the ledge of the first support of the one or more supports of the fourth foundation is adjacent to the second end of the first board-sheet, the first end opposite to the second end.

16. The method of claim 15 further comprising:

disposing a second board-sheet on a second support of the one or more supports of the second foundation;

affixing with fasteners the second board-sheet to the base of the second foundation;

disposing the second board-sheet on a second support of the one or more supports of the fourth foundation; and affixing with fasteners the second board-sheet to the base of the fourth foundation.

17. The method of claim 9, in which the suction member of the first foundation including a tab configured to release a seal of the suction member from the surface against which the suction member is sealed, wherein a gap is provided between the structure and the first board-sheet, the tab accessible via the gap when the first foundation is secured to the surface and the first board-sheet is affixed to the base of the first foundation.

18. A system for boarding-up a window disposed in a structure, the window including a surface, wherein the structure is a wall, a door or roof, and the surface is glass or a mirror, the system comprising:

a plurality of foundations mounted on a surface, each foundation comprising:

a base having an inner face and an outer face disposed opposite to the outer face;

a suction assembly mounted to the inner face, the suction assembly including:

a suction cup having a rim, the suction cup defining a chamber with the surface when the surface is disposed against the rim, the suction cup configured to be releasably sealed against the surface when air is removed from the chamber; and a pump in fluid communication with the chamber, the pump configured to draw air out of the chamber;

a shield mounted to the outer face and covering at least a portion of the outer face, the shield disposed opposite to the suction cup and configured to obstruct penetration by a nail or a screw into the portion of the outer face covered by the shield, wherein the shield is a metal plate; and one or more supports mounted to the outer face, each support defining a channel and including a ledge disposed between a first and second sidewalls, the ledge extending outward from the base and disposed along an outer face edge of the base; and a first board-sheet having a first end and a second end, the first end of the first board-sheet disposed in a first support of the one or more supports of each of the first and second foundations, and the second end disposed in a first support of the one or more supports of each of the third and fourth foundations.

19. The system of claim 18, in which the suction assembly further includes a cover adjacent to the inner face, the cover including a collar having a bore configured to receive a threaded member, wherein the pump is disposed between the cover and the suction cup.

20. The system of claim 18, in which the suction assembly further includes a cover adjacent to the inner face, and in which the shield further includes one or more apertures extending therethrough, and each foundation further comprises:

one or more cylinders disposed between the base and the suction cup; and one or more threaded members, each threaded member extending through one of the apertures and through the base and one of the cylinders into the cover, wherein the pump is disposed between the cover and the suction cup.

* * * * *